United States Patent Office 2,947,371
Patented Aug. 2, 1960

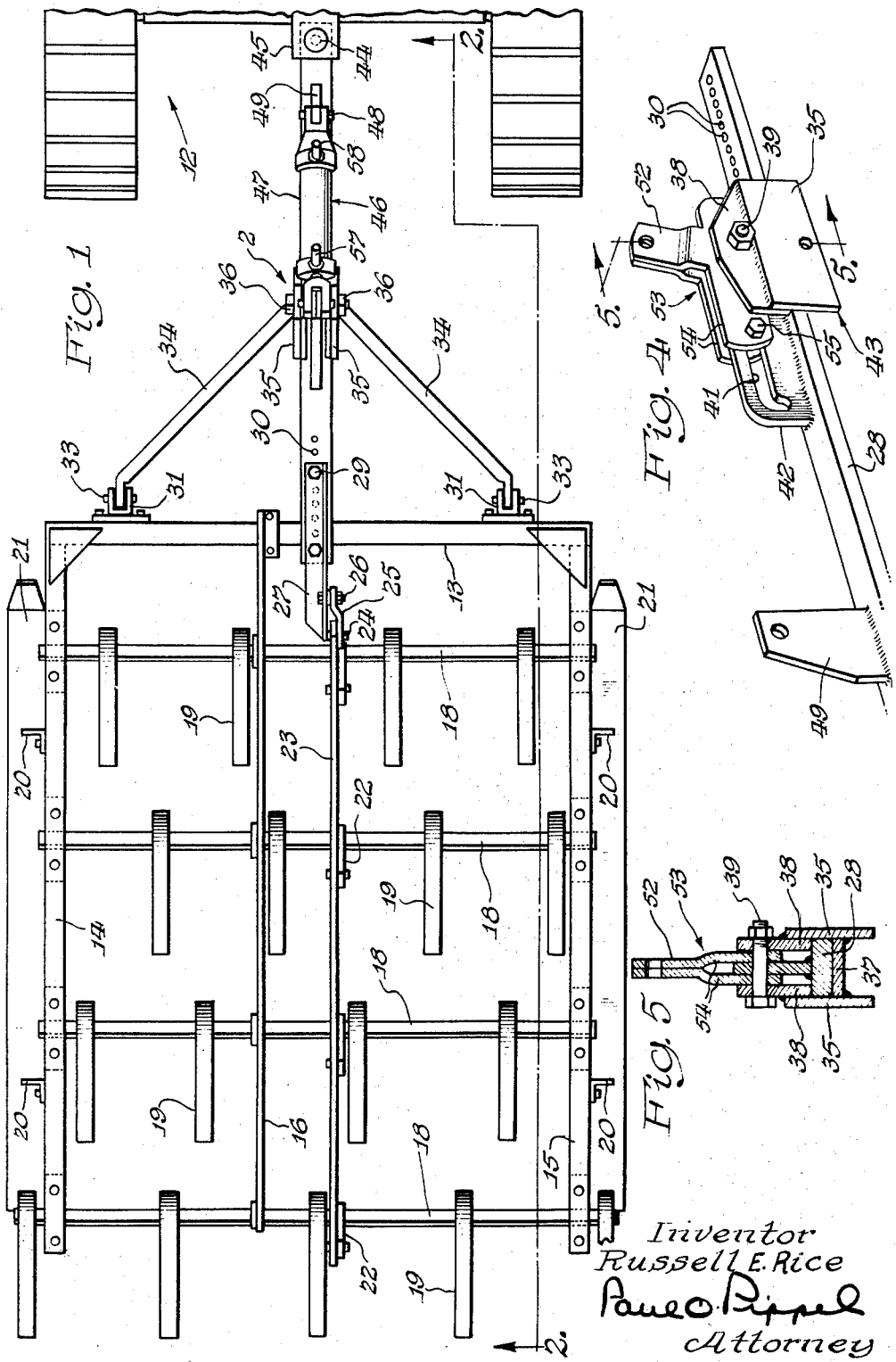

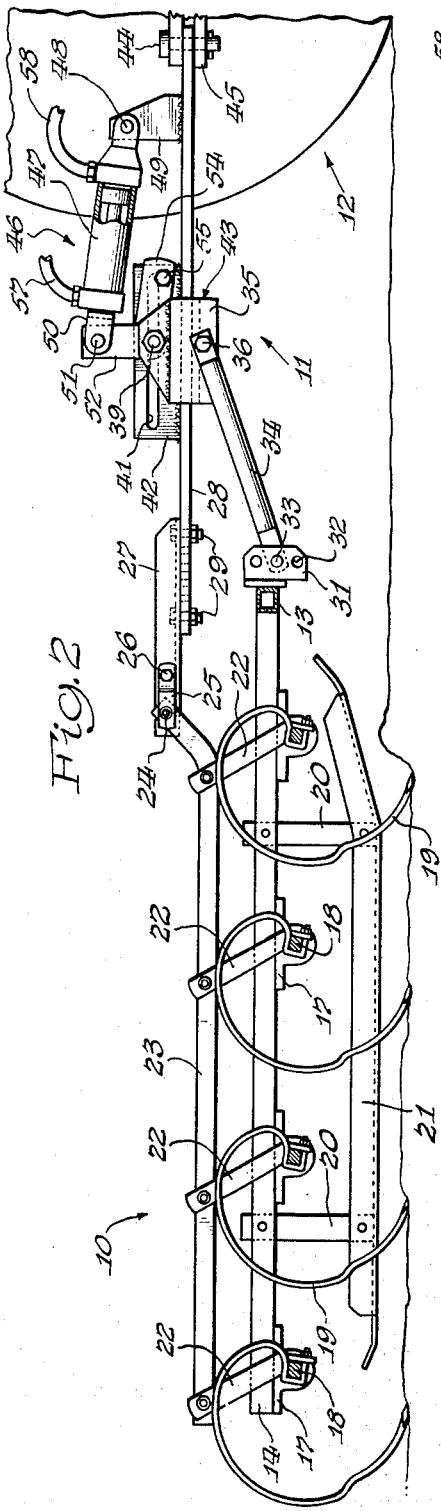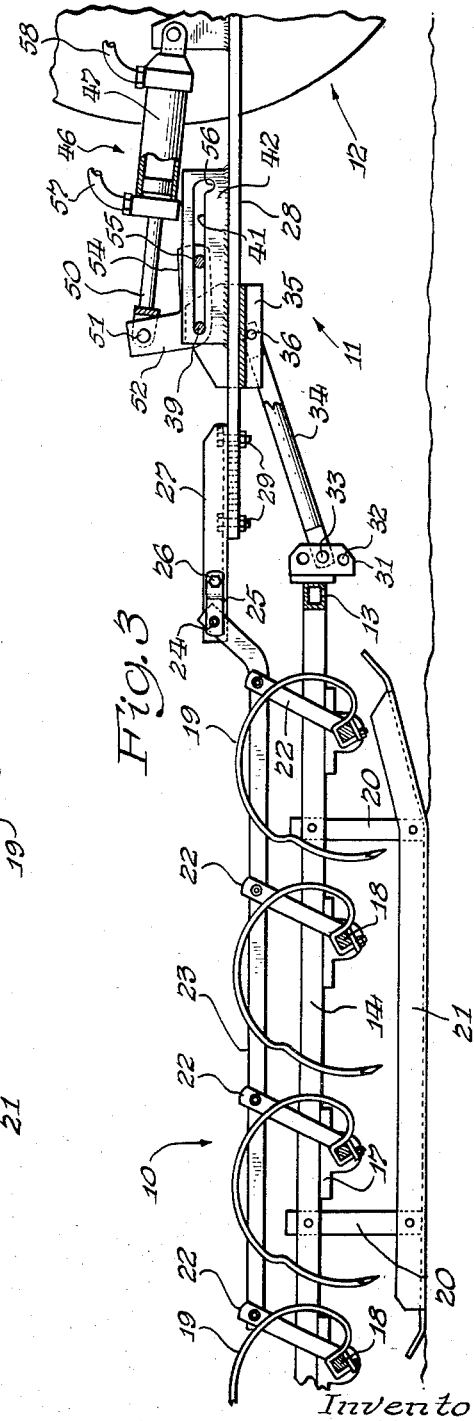

2,947,371

IMPLEMENT CONTROL APPARATUS

Russell E. Rice, Stockton, Calif., assignor to International Harvester Company, Chicago, Ill., a corporation of New Jersey Filed Dec. 9, 1957, Ser. No. 701,419

6 Claims. (Cl. 172—605)

This invention relates to agricultural implements and particularly to earth-working implements. More specifically the invention concerns a cultivating implement such as a spring tooth harrow. A spring tooth harrow of the type with which this invention is concerned generally comprises a rectangular frame having ground supports such as sled-type runners and a plurality of transverse shafts on which a number of cultivating teeth are mounted, the teeth being swung from an operating to a non-operating position by rocking the shaft on which they are mounted. An implement of this type is connected to a tractor in trailing relation and as many harrow or cultivator sections can be connected together as can be propelled by the tractor or other vehicle. The implement is moved to its non-operating position by rocking the spring teeth about the axes of said shafts to permit the implement to be transported on its runner supports.

An object of this invention is the provision of an improved implement and hitch construction wherein novel means are provided for moving the implement from operating to a non-operating position.

Another object of the invention is the provision of novel implement control apparatus wherein a slidable hitch part is connected to a movable section of the implement and the hydraulic ram actuates the slidable part to move said movable section.

Another object of the invention is the provision of a novel hydraulic ram mounting for an implement such as a spring tooth harrow wherein a slidable member on the implement hitch structure is shifted by the ram and is connected to a movable part of the implement, the slidable member being lockable to the hitch structure by means releasable by the operation of the ram.

In an implement of the type described, draft may be transmitted through the ram and the slidable member on the hitch to the movable section of the implement. However, larger implements place an abnormal strain on the ram, and a further object of the invention is the provision of means for relieving the ram of draft load by providing a recess in the hitch structure and a pin carried by the slidable member receivable in said recess to secure the slidable member to the stationary part of the hitch, the pin or other detent means being releasable from the recess by the initial operation of the ram.

Other objects and advantages of the invention will become clear from the following detailed description when read in conjunction with the accompanying drawings, wherein:

Figure 1 is a plan view of a single section of a spring tooth harrow and hitch assembly incorporating the features of this invention connected in draft receiving relation to the rear end of a tractor;

Figure 2 is a sectional view taken on the line 2—2 of Figure 1 showing the position of the parts when the implement is in operation;

Figure 3 is a view similar to Figure 2 but showing the implement in its raised or transport position;

Figure 4 is a view in perspective of a portion of the implement structure illustrating the novel cylinder mounting of this invention; but with the cylinder removed; and Figure 5 is a section taken on the line 5—5 of Figure 4.

In the drawings the numeral 10 designates the tool-carrying portion of a spring tooth harrow having a hitch structure 11 adapted for connection in trailing relation to a tractor 12. The tool-carrying section of the harrow is generally rectangular and comprises a forward transverse bar 13 and side bars 14 and 15. An additional longitudinally extending brace 16 is provided and each of the side bars 14 and 15 and brace 16 have secured to and depending therefrom a plurality of longitudinally spaced bearing brackets 17.

Longitudinally spaced transversely extending shafts 18, square in cross-section, are rockably received in transversely aligned bearing brackets 17. A plurality of curved spring cultivator or harrow teeth 19 are secured at spaced locations on the shafts 18 for rocking about the axes of the shafts from the earth-working position shown in Figure 2 to the non-operating or transport position shown in Figure 3.

Longitudinally spaced vertical supporting members 20 are affixed to and depend from the side bars 14 and 15 and have secured at their lower ends laterally spaced ground-engaging runners 21.

Each of said shafts 18 has secured thereto centrally thereof and extending vertically upwardly therefrom, an arm 22, the upper end of each of which is pivotally connected to a longitudinally extending bar 23, the forward end of which is bent upwardly and pivotally connected by a pin 24 to one end of a strap 25, the other end of which is secured by a bolt 26 to the rear end of an angle bar 27.

Angle bar 27 is adjustably secured to the rear end of a hitch bar 28 by means of bolts 29 adapted to be received in any two of a plurality of openings 30 provided in the bar 28. Angle bar 27 and hitch bar 28 form a relatively stationary part of the hitch structure 11 and provide a rigid anchor point for the forward end of bar 23. By adjusting bar 27 with respect to bar 28, the extent of rocking of shafts 28 can be controlled to regulate the operating position of the earth-working teeth 19.

A pair of laterally spaced vertically extending channel members 31 are secured to the forward face of transverse frame members 13 and are provided with a plurality of vertically spaced openings 32 for the reception of pins 33 upon which are pivotally mounted the rear ends of a pair of forwardly converging links 34, the forward ends of which are pivotally connected by bolts 36 to the downwardly projecting ends of side plates 35 adapted to straddle bar 28. Plates 35 are connected by a web 37 engaging the lower face of bar 28, and upper portions of plates 35 are affixed, as by welding, to the outer faces of a pair of plates 38, the lower edges of which engage the upper face of bar 28. Plates 38 are apertured to receive a pivot bolt 39 which extends transversely through a longitudinally extending slot 41 in a plate 42 extending upright from and secured by welding to bar 28.

At this point it should be clear that the plates 35 and 38 and web 37 form a member, designated by the numeral 43 that is longitudinally slidable on bar 28 within the confines of the slot 41. Bar 28 is pivotally connected by a hitch pin 44 to the drawbar 45 of the tractor 12, and the limit of slot 41 is reached and engaged by pin 39 when the implement is in the non-operating transport position of Figure 3. In order to control the operation of the implement a power operating unit in the form of a hydraulic ram assembly 46 is utilized. Ram 46 comprises a cylinder 47 pivotally anchored at 48 to a lug 49 affixed to and extending upwardly from the hitch structure 28, and a piston rod 50, slidable in cylinder 47, is pivotally connected by a pin 51 to the upwardly extending arm 52 of a bell crank 53 fulcrumed on the pivot bolt 39, and having another arm 54 in the form of laterally spaced members straddling plate 42 and carrying a bolt 55 at their ends extending through slot 41.

The hydraulic ram 46 is substantially fully extended in the position of Figure 3 with pin 39 at the rear end of slot 41 and the teeth 19 in raised position. Contraction of the ram 46 returns the teeth 19 to their operating position as shown in Figure 2, bolts 39 and 55 riding forwardly in slot 41 of guide bracket 42. A recess 56 extends downwardly from the slot at the forward end thereof, and when bolt 55 engages the forward wall of the slot 41 continued retraction of the piston rod 50 in cylinder 47 rocks the bell crank 53 about its fulcrum 39 to drop the bolt or pin 55 into the recess. This permits draft from the tractor to the implement to be transmitted through bolt 55 and bracket 42 of the hitch structure instead of through the ram 46, eliminating the likelihood of draft forces acting on the implement damaging the power unit.

Fluid under pressure to extend and retract ram 46 is supplied through hose lines 57 and 58 from a source, not shown, on the tractor 12.

The implement rests on runners 21, and rod 23 is held stationary by its pivotal connection at 24 to the bar 27 of hitch structure 28. Therefore, when the ram 46 is extended slidable member 43 moves rearwardly on bar 28, exerting thrust through links 34 to the tool-carrying frame to swing it rearwardly along with rock arms 22, rock shafts 18 and the spring teeth 19 secured thereto to the raised position of Figure 3.

Operation of the implement and control apparatus of this invention should be clearly understood from the foregoing description. It should likewise be understood that the invention has been described in its preferred embodiment only and that modifications may be made therein without departing from the spirit of the invention or the scope of the appended claims.

What is claimed is:

1. In an implement having a frame and an earth-working tool relatively movable between operating and transport positions of the tool, a hitch structure including a relatively stationary part and a member longitudinally slidable relative thereto, means operatively connecting said tool to said relatively stationary part, means operatively connecting said slidable member to said implement frame for moving the latter relative to said first mentioned means to raise and lower the earth-working tool, locking means releasably connecting said slidable member to said stationary part, whereby draft is transmitted therethrough to said implement frame, a hydraulic ram mounted on said hitch structure, and means operatively connecting said ram to said slidable member for moving the latter relative to said stationary part to raise and lower the earth-working tools including means actuated by said ram for releasing said locking means.

2. In an implement having a frame and an earth-working tool relatively movable between operating and transport positions of the tool, a hitch structure including a relatively stationary part and a member longitudinally slidable relative thereto, means operatively connecting said tool to said relatively stationary part, means operatively connecting said slidable member to said implement frame for moving the latter relative to said first mentioned means to raise and lower the earth-working tool, locking means releasably connecting said slidable member to said stationary part, whereby draft is transmitted therethrough to said implement frame, a hydraulic ram mounted on said hitch structure, and means operatively connecting said ram to said slidable member for moving the latter and said frame relative to said earth-working tool to raise and lower the latter comprising a rockable member pivotally mounted on said slidable member and having a locking part cooperatively engageable with said stationary part to hold the slidable member against movement relative thereto, said rockable member being adapted to be rocked by the first part of the stroke of said ram to move said locking part out of engagement with said stationary part.

3. In an earth-working implement adapted for connection to a tractor, a mobile frame, a plurality of transverse tool-carrying shafts rockably mounted on the frame to move the tools from operating to transport position, a hitch structure including a part connected to the tractor in draft-receiving relation and a member slidable on said part connected to said mobile frame, a longitudinally extending bar operatively connected to said shafts and to said hitch part, said slidable member having a pin and said hitch part having a recess therein to receive said pin and hold the slidable member against movement relative to said part, whereby draft is transmitted from the tractor through said slidable member to the mobile frame, and power operated means mounted on said hitch part and operatively connected to said pin, said power operated means being operable in one range of movement thereof to release the pin from said recess and in another range of movement to shift said slidable member and said mobile frame relative to said longitudinally extending bar to rock said shafts.

4. In an earth-working implement adapted for connection to a tractor, a mobile frame, a plurality of transverse tool-carrying shafts rockably mounted on the frame to move the tools from operating to transport position, a hitch structure including a part connected to the tractor in draft-receiving relation and a member slidable on said part connected to said mobile frame, a longitudinally extending bar operatively connected to said shafts and to said hitch part, a bell crank fulcrumed on said slidable member, a pin carried by one arm of said bell crank, said hitch part having a recess therein adapted to receive and confine said pin to hold the slidable member against movement relative to said part, whereby draft is transmitted from the tractor through said slidable member to the mobile frame, and a hydraulic ram anchored at one end to said hitch part and at its other end to the other arm of said bell crank, said ram being operable in one direction to first rock said bell crank to release said pin and then to shift said slidable member and said mobile frame relative to said bar to rock said shafts.

5. An implement hitch having a relatively stationary part connected to a relatively stationary section of the implement and a movable part connected to a movable section of the implement, comprising a bracket secured to said relatively stationary part having a longitudinally extending slot therein, a pin carried by said movable member slidably receivable in said slot, a hydraulic ram anchored at one end to said stationary part and operatively connected at its other end to said pin, and said slot having a recess therein adapted to receive said pin after a predetermined sliding movement thereof to lock the relatively stationary part to the movable part of the hitch.

6. The invention set forth in claim 5, wherein said pin is carried by one arm of a bell crank fulcrumed on said movable member, said bell crank being rockable to move the pin in and out of said recess, and the hydraulic ram being connected to the other arm of said bell crank for rocking the latter by operation of the ram.

References Cited in the file of this patent

UNITED STATES PATENTS

| | | |
|---|---|---|
| 1,923,930 | Johnson et al. | Aug. 22, 1933 |
| 2,307,436 | Wadelton et al. | Jan. 5, 1943 |
| 2,392,018 | White | Jan. 1, 1946 |